United States Patent [19]

Raab

[11] Patent Number: 5,402,582

[45] Date of Patent: Apr. 4, 1995

[54] THREE DIMENSIONAL COORDINATE MEASURING APPARATUS

[75] Inventor: Simon Raab, Longwood, Fla.

[73] Assignee: Faro Technologies Inc., Lake Mary, Fla.

[21] Appl. No.: 21,949

[22] Filed: Feb. 23, 1993

[51] Int. Cl.⁶ ............................................. G01B 7/03
[52] U.S. Cl. ....................................... 33/503; 33/504; 33/1 PT; 364/413.13
[58] Field of Search ............... 33/503, 502, 504, 1 V, 33/1 N, 1 M, 1 PT; 364/413.13

[56] References Cited

U.S. PATENT DOCUMENTS

| | | |
|---|---|---|
| 2,906,179 | 9/1959 | Bower . |
| 3,531,868 | 10/1970 | Stevenson . |
| 3,890,958 | 6/1975 | Fister et al. . |
| 3,944,798 | 3/1976 | Eaton . |
| 4,571,834 | 2/1986 | Fraser et al. .................. 33/1 PT |
| 4,638,798 | 1/1987 | Sheldon et al. . |
| 4,653,011 | 3/1987 | Iwano . |
| 4,670,851 | 6/1987 | Murakami et al. . |
| 4,676,002 | 6/1987 | Slocum ............................... 33/503 |
| 4,679,331 | 7/1987 | Koontz ............................... 33/503 |
| 4,703,443 | 10/1987 | Moriyasu ........................... 364/559 |
| 4,750,487 | 6/1988 | Zanetti . |
| 4,769,763 | 9/1988 | Trieb et al. ....................... 364/559 |
| 4,791,934 | 12/1988 | Brunnett . |
| 4,819,195 | 4/1989 | Bell et al. .......................... 33/503 |
| 4,888,877 | 12/1989 | Enderle et al. .................... 33/504 |
| 4,891,889 | 1/1990 | Tomelleri .......................... 33/504 |
| 4,942,545 | 7/1990 | Sapia ................................. 33/504 |
| 4,945,501 | 7/1990 | Bell et al. . |
| 4,962,591 | 10/1990 | Zeller et al. ....................... 33/502 |
| 4,982,504 | 1/1991 | Söderberg et al. ................ 33/503 |
| 5,040,306 | 8/1991 | McMurtry et al. ............... 33/556 |
| 5,050,608 | 9/1991 | Watanabe et al. . |
| 5,088,046 | 2/1992 | McMurtry . |
| 5,088,055 | 2/1992 | Oyama . |
| 5,131,844 | 7/1992 | Marinaccio et al. . |
| 5,148,377 | 9/1992 | McDonald . |
| 5,187,874 | 2/1993 | Takahashi et al. ................ 33/503 |
| 5,189,806 | 3/1993 | McMurtry et al. . |
| 5,204,824 | 4/1993 | Fujimaki . |
| 5,230,623 | 7/1993 | Guthrie et al. . |
| 5,251,127 | 10/1993 | Raab .................................. 606/130 |
| 5,251,156 | 10/1993 | Heier et al. . |
| 5,259,120 | 11/1993 | Chapman et al. . |

FOREIGN PATENT DOCUMENTS

| | | |
|---|---|---|
| 2597969 | 4/1986 | France . |
| 2674017 | 3/1991 | France . |
| 2094590 | 9/1982 | United Kingdom . |

*Primary Examiner*—Christopher Fulton
*Attorney, Agent, or Firm*—Fishman, Dionne & Cantor

[57] ABSTRACT

A novel, portable coordinate measuring machine comprises a multijointed (preferably six joints) manually positionable measuring arm for accurately and easily measuring a volume, which in a preferred embodiment, comprises a sphere ranging from six to eight feet in diameter and a measuring accuracy of 2 Sigma±0.005 inch. In addition to the measuring arm, the present invention employs a controller (or serial box) which acts as the electronic interface between the arm and a host computer.

41 Claims, 17 Drawing Sheets

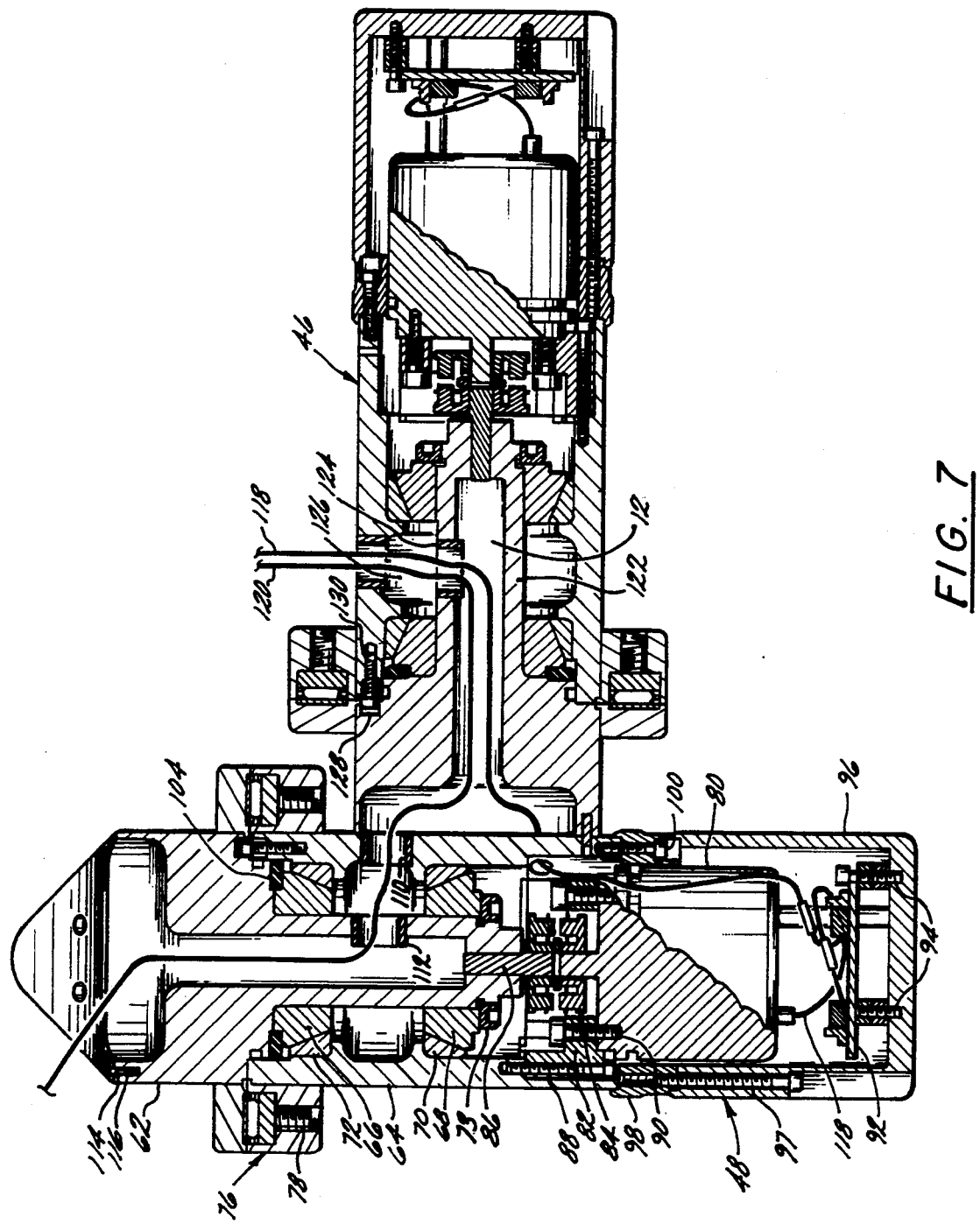

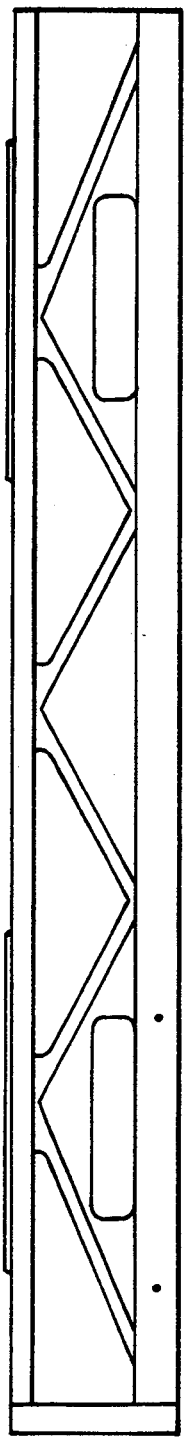
FIG. 20C
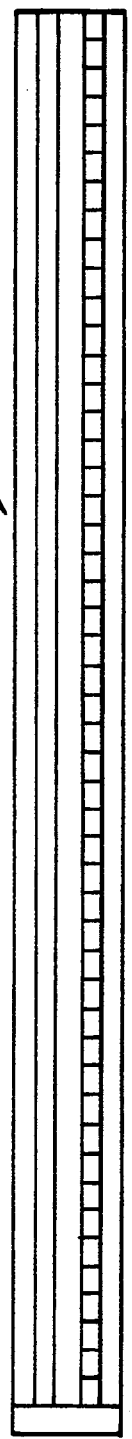
FIG. 20B
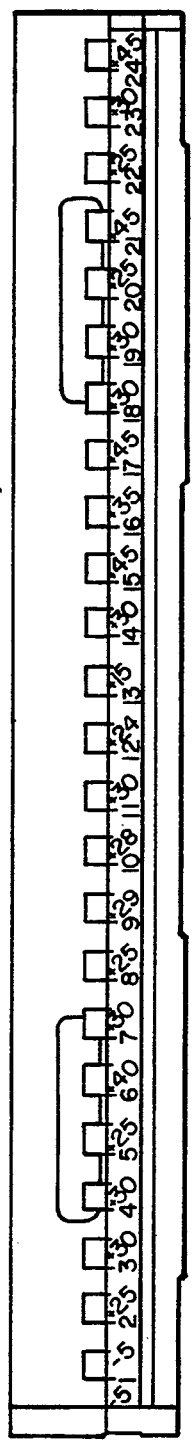
FIG. 20A
FIG. 20D
FIG. 20E

THREE DIMENSIONAL COORDINATE MEASURING APPARATUS

BACKGROUND OF THE INVENTION

This invention relates generally to three dimensional coordinate measuring machines (or CMM's). More particularly, this invention relates to a new and improved three dimensional CMM which is portable and provides improved accuracy and ease of use.

It will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. These devices are typically non-portable, expensive and limited in the size or volume that can be easily measured.

FARO Technologies, Inc. of Lake Mary, Fla. (the assignee of the present invention) has successfully produced a series of electrogoniometer-type digitizing devices for the medical field. In particular, FARO Technologies, Inc. has produced systems for skeletal analysis known as METRECOM ® and systems for use in surgical applications known as SURGICOM ™. Electrogoniometer-type devices of the type embodied in the METRECOM and SURGICOM systems are disclosed in U.S. Pat. Nos. 4,670,851 and 5,305,203 and 5,251,127 all of which are assigned to the assignee hereof and incorporated herein by reference.

While well suited for their intended purposes, the METRECOM and SURGICOM electrogoniometer-type digitizing systems are not well suited for general industrial applications where three dimensional measurements of parts and assemblies are often required. Therefore, there is a continuing need for improved, accurate and low cost CMM's for industrial and related applications.

SUMMARY OF THE INVENTION

The above-discussed and other problems and deficiencies of the prior art are overcome or alleviated by the three dimensional measuring instrument (e.g., electrogoniometer) of the present invention. In accordance with the present invention, a novel, portable coordinate measuring machine comprises a multijointed (preferably six joints) manually positionable measuring arm for accurately and easily measuring a volume, which in a preferred embodiment, comprises a sphere preferably ranging from six to eight feet in diameter (but which may also cover diameters more or less than this range) and a measuring accuracy of preferably 2 Sigma±0.0005 inch (and optimally 2 Sigma±0.001 inch). It will be appreciated that "Sigma" means "one standard deviation". In addition to the measuring arm, the present invention employs a controller (or serial box) which acts as the electronic interface between the arm and a host computer.

The mechanical measuring arm used in the CMM of this invention is generally comprised of a plurality of transfer housings (with each transfer housing comprising a joint and defining one degree of rotational freedom) and extension members attached to each other with adjacent transfer housings being disposed at right angles to define a movable arm preferably having five or six degrees of freedom. Each transfer housing includes measurement transducers and novel bearing arrangements. These novel bearing arrangements include prestressed bearings formed of counter-positioned conical roller bearings and stiffening thrust bearings for high bending stiffness with low profile structure. In addition, each transfer casing includes visual and audio endstop indicators to protect against mechanical overload due to mechanical stressing.

The movable arm is attached to a base or post which includes (1) a temperature monitoring board for monitoring temperature stability; (2) an encoder mounting plate for universal encoder selection; (3) an EEPROM circuit board containing calibration and identification data so as to avoid unit mixup; and (4) a preamplifier board mounted near the encoder mounting plate for transmission of high amplified signals to a remote counter board in the controller.

As in the prior art METRECOM system, the transfer casings are modular permitting variable assembly configurations and the entire movable arm assembly is constructed of one material for ensuring consistent coefficient of thermal expansion (CTE). Similarly as in the METRECOM system, internal wire routing with rotation stops and wire coiling cavities permit complete enclosure of large numbers of wires. Also consistent with the prior art METRECOM system, this invention includes a spring counterbalanced and shock absorbed support mechanism for user comfort and a two switch (take/accept) data entry device for allowing high precision measurements with manual handling. Also, a generalized option of the type used in the prior art METRECOM system is provided for the measurement of variables in three dimensions (e.g., temperature may be measured in three dimensions using a thermocouple attached to the option port).

The use of a discrete microprocessor-based controller box is an important feature of this invention as it permits preprocessing of specific calculations without host level processing requirements. This is accomplished by mounting an intelligent preprocessor in the controller box which provides programmable adaptability and compatibility with a variety of external hosts (e.g., external computers). The serial box also provides intelligent multi-protocol evaluation and autoswitching by sensing communication requirements from the host. For example, a host computer running software from one manufacturer will generate call requests of one form which are automatically sensed by the controller box. Still other features of the controller box include serial port communications for standardized long distance communications in a variety of industrial environments and novel analog-to-digital/digital counter boards for simultaneous capture of every encoder (located in the transfer housing) resulting in highly accurate measurements.

Efficient on-site calibration of the CMM of the present invention is improved through the use of a reference ball positioned at the base of the CMM to obviate potential mounting complications to system accuracy evaluation. In addition, the CMM of this invention includes means for performing a volumetric accuracy measurement protocol on an interim basis, preferably using a novel cone ballbar device.

The above-discussed and other features and advantages of the present invention will be appreciated and understood by those skilled in the art from the following detailed description and drawings.

BRIEF DESCRIPTION OF THE DRAWINGS

Referring to the drawings, wherein like elements are numbered alike in the several FIGURES:

FIG. 7 is a cross-sectional elevation view of two assembled, transversely orientated transfer housings;

FIGS. 20A–E are respective front, rear, top, right side and left side elevation views of the precision step gauge used in the jig of FIG. 19.

DESCRIPTION OF THE PREFERRED EMBODIMENT

Figure 1:
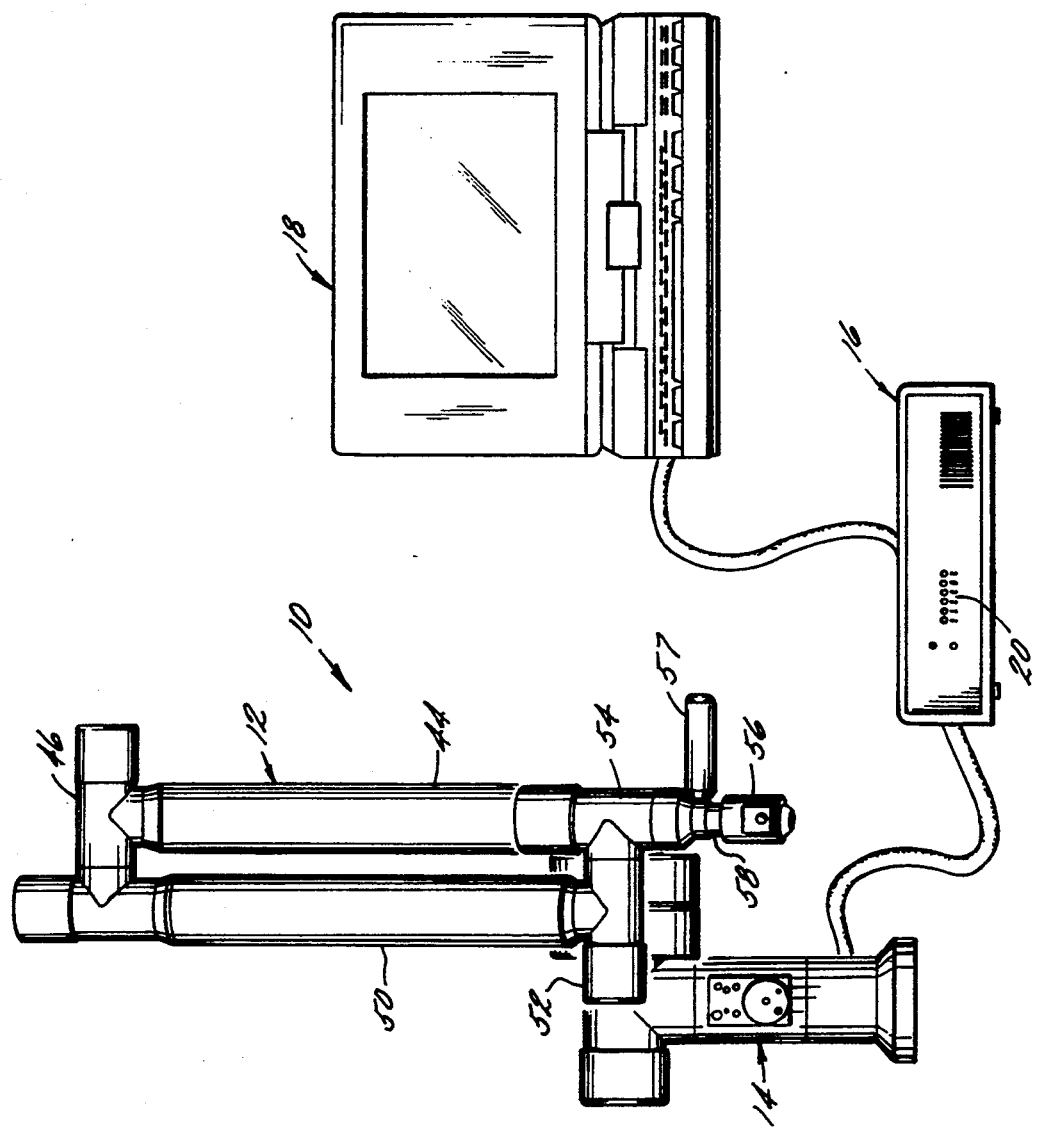
FIG. 1 is a front diagrammatic view depicting the three dimensional measuring system of the present invention including a coordinate measuring machine, a controller box and a host computer.

Referring first to FIG. 1, the three dimensional measuring system of the present invention generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

Figure 2:
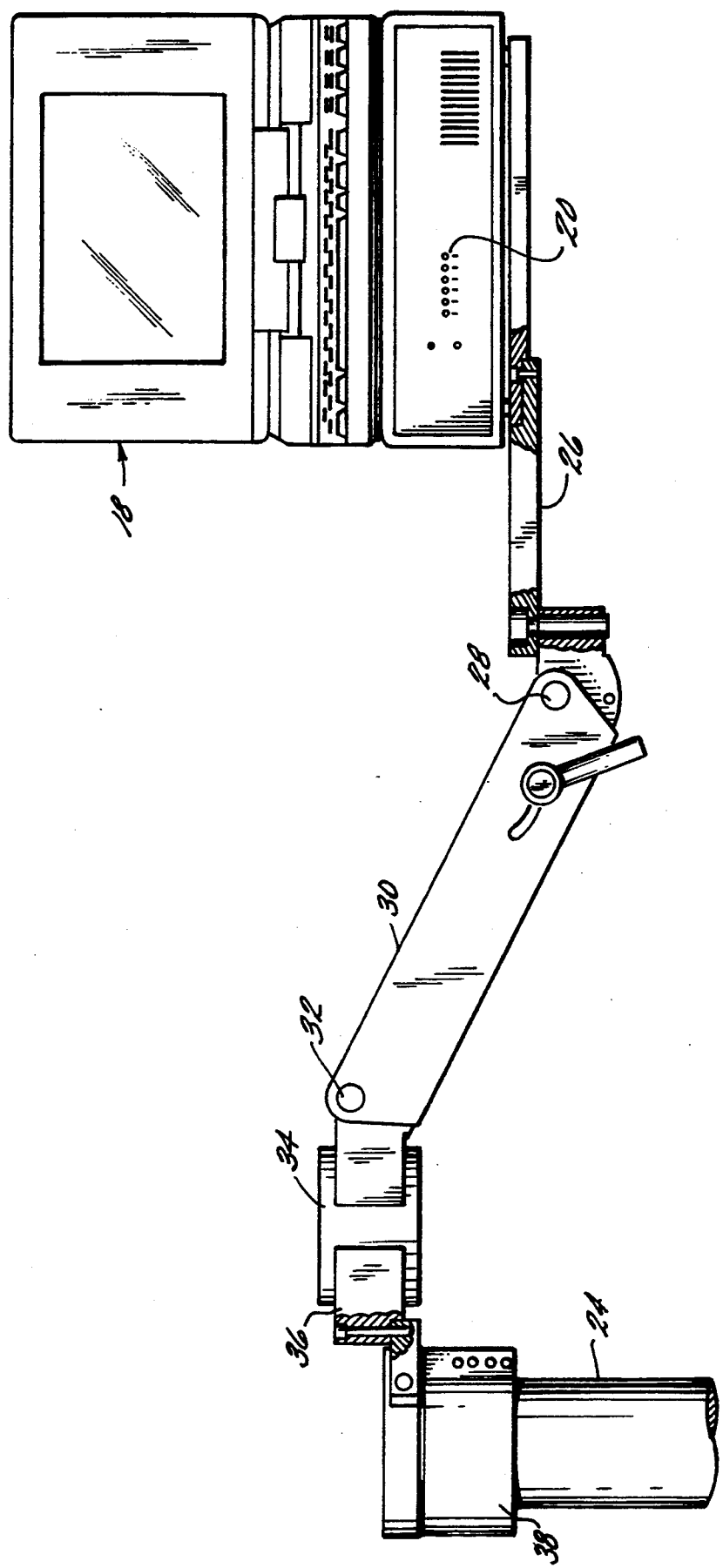
FIG. 2 is a side elevation view depicting the host computer mounted on the serial box, which is in turn, mounted on a maneuverable arm.
Figure 4:
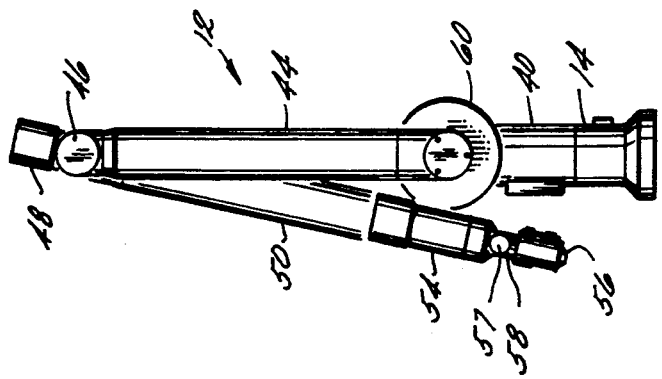
FIG. 4 is a rear elevation view of the CMM shown in FIG. 1.

As will be discussed in more detail hereinafter, CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. As shown in FIG. 2, serial box 16 is intended to be positioned under the host computer 18 (such as the notebook computer shown in FIG. 2) and includes EEPROMS which contain data handling software, a microcomputer processor, a signal processing board and a number of indicator lights 20. As mentioned, basic transducer data is sent from CMM 10 to serial box 16. Serial box 16 then processes the raw transducer data on an ongoing basis and responds to the queries of the host computer with the desired three-dimensional positional or orientational information.

Figure 3:
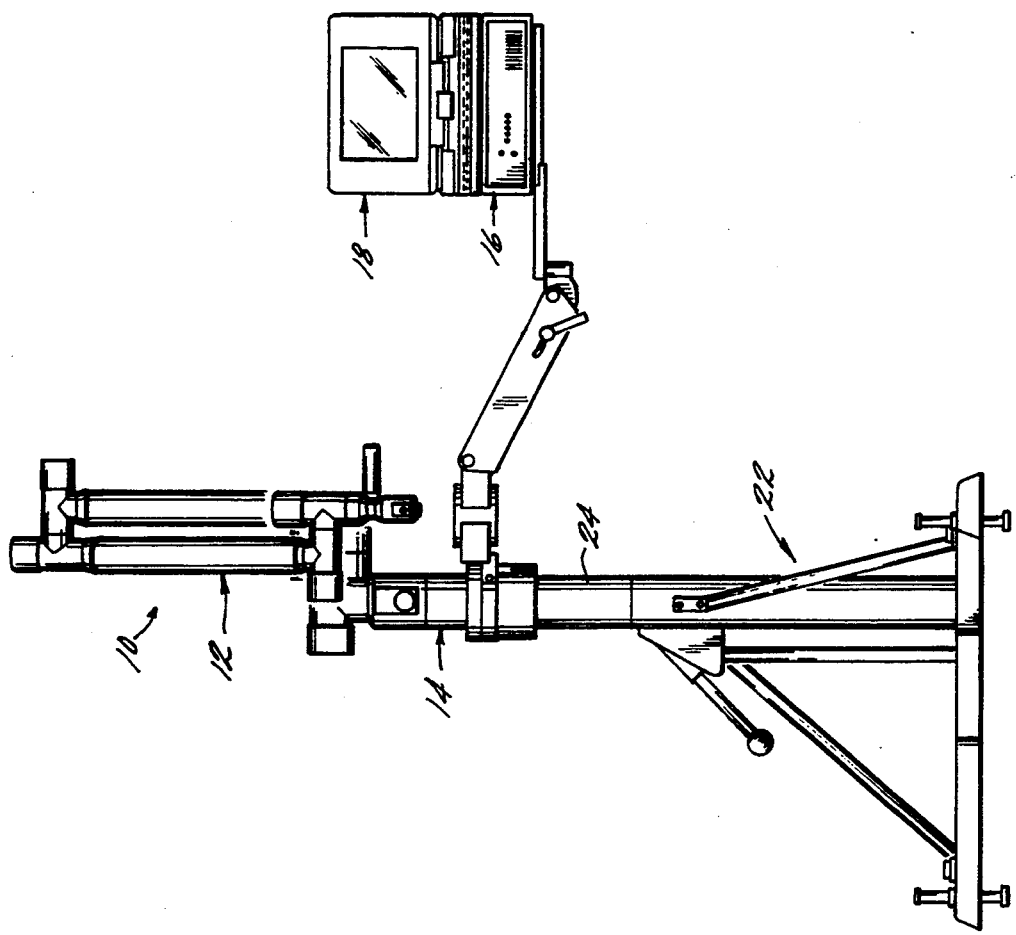
FIG. 3 is a side elevation view of the three dimensional measuring system of the present invention mounted on a theodolite stand.

Preferably, all three components defining the three dimensional measuring system of this invention (e.g., CMM 10, serial box 16 and host computer 18) are mounted on either a fixed mounting surface using a rigid plate and/or a standard optical measurement instrument thread followed by mounting on a known and standard theodolite mobile stand such as shown at 22 in FIG. 3. Preferably, theodolite stand 22 comprises a part no. MWS750 manufactured by Brunson. Such a mobile stand is characterized by a stable rolling platform with an extendable vertical tower and with common attachments and locking mechanisms. As shown in FIGS. 2 and 3, support base 14 of CMM 10 is threaded or otherwise attached onto a vertical support member 24 of stand 22 while serial box 16/host 18 is supported on a shelf 26 pivotally connected at a first joint 28 to an arm 30 which is pivotally connected to a second joint 32. Connecting member 34 interconnects joint 32 to a swivel connection 36 attached to a cap 38 mounted over the top of member 24.

Figure 5:
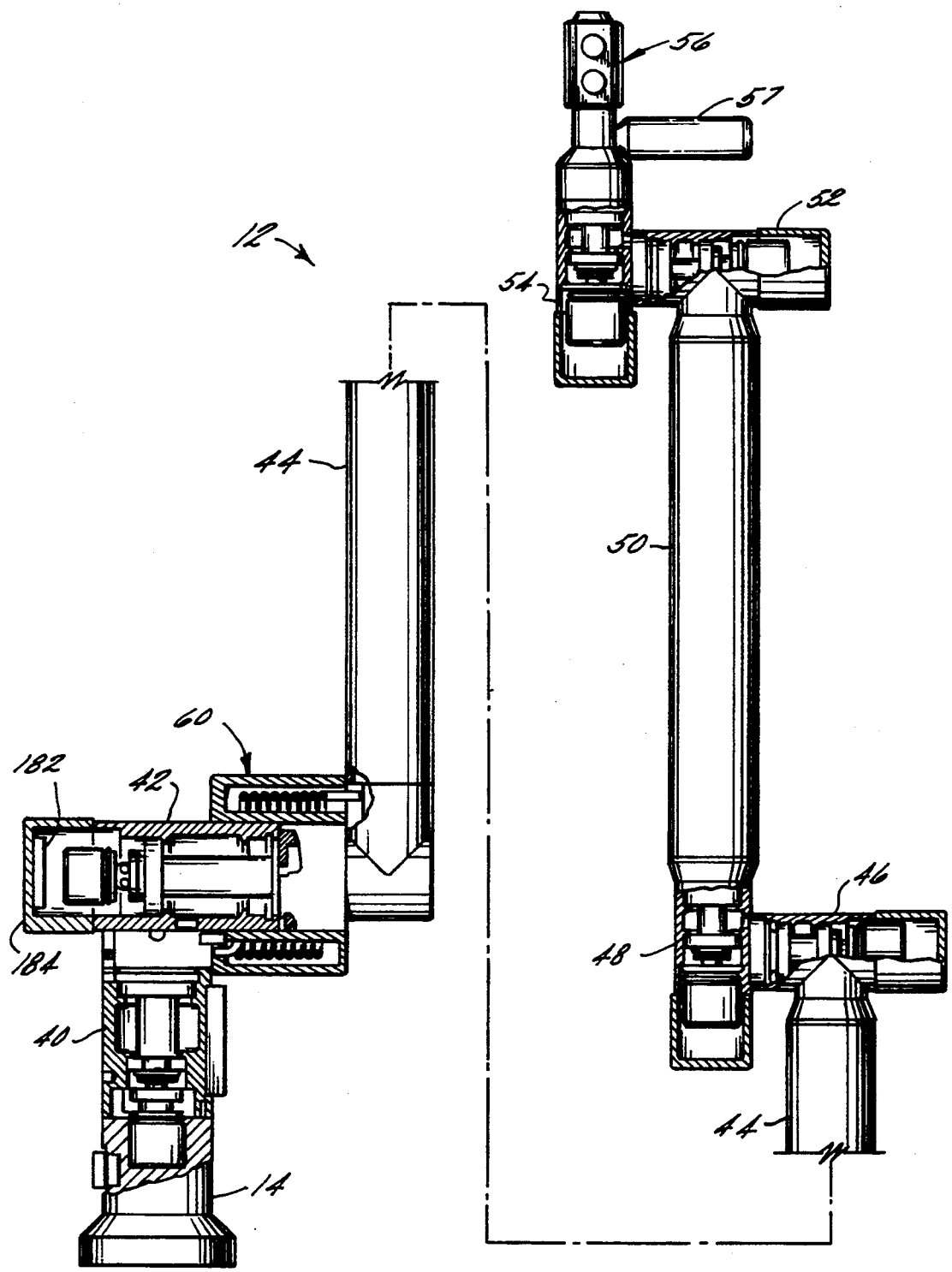
FIG. 5 is a longitudinal view, partly in cross-section of the CMM of FIG. 1.

Referring now to FIGS. 1 and 4–9, CMM 10 will now be described in detail. As best shown in FIG. 5, CMM 10 comprises a base 14 connected to a first set of two transfer housings including a first transfer housing 40 which, in turn, is connected to a second transfer housing 42 (positioned transverse to housing 40). A first extension member 44 is rigidly attached to a second set of two transfer housings including a third transfer housing 46 transversely attached to a fourth transfer housing 48. First extension member 44 is positioned perpendicularly between transfer housings 42 and 46. A second extension member 50 is aligned with and rigidly attached to transfer housing 48. Rigid extension member 50 is rigidly attached to a third set of two transfer housings including a fifth transfer housing 52 transversely attached to a sixth transfer housing 54. Fifth transfer housing 54 has attached thereto a handle/probe assembly 56.

Figure 8:
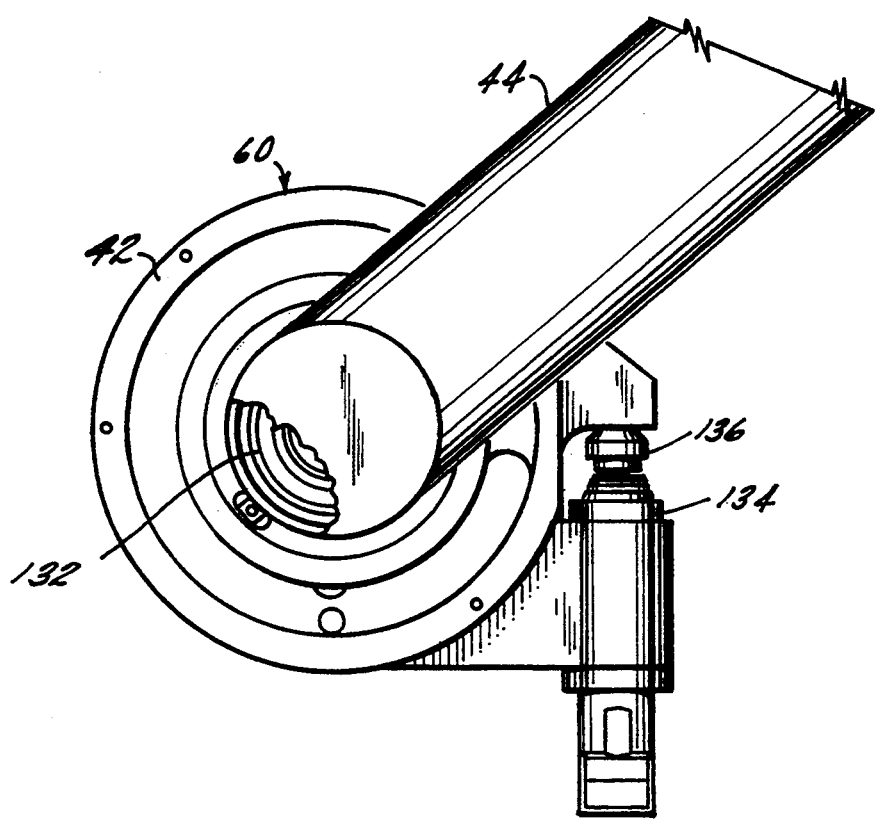
FIG. 8 is an enlarged, side elevation view of a counterbalanced spring device used in the CMM of FIG. 1.

In general (and as will be discussed in more detail hereinafter), position sensing transducers are mounted in each of the six transfer housings 40, 42, 46, 48, 52 and 54. Each housing is comprised of bearing supports and transducer compartments which are made to then cylindrically attach to each other using 45° angled attachment screws (not shown). At the base 14 is a counterbalanced spring device 60 for support of arm 12 in its standard vertical configuration (FIG. 8).

Figure 6:
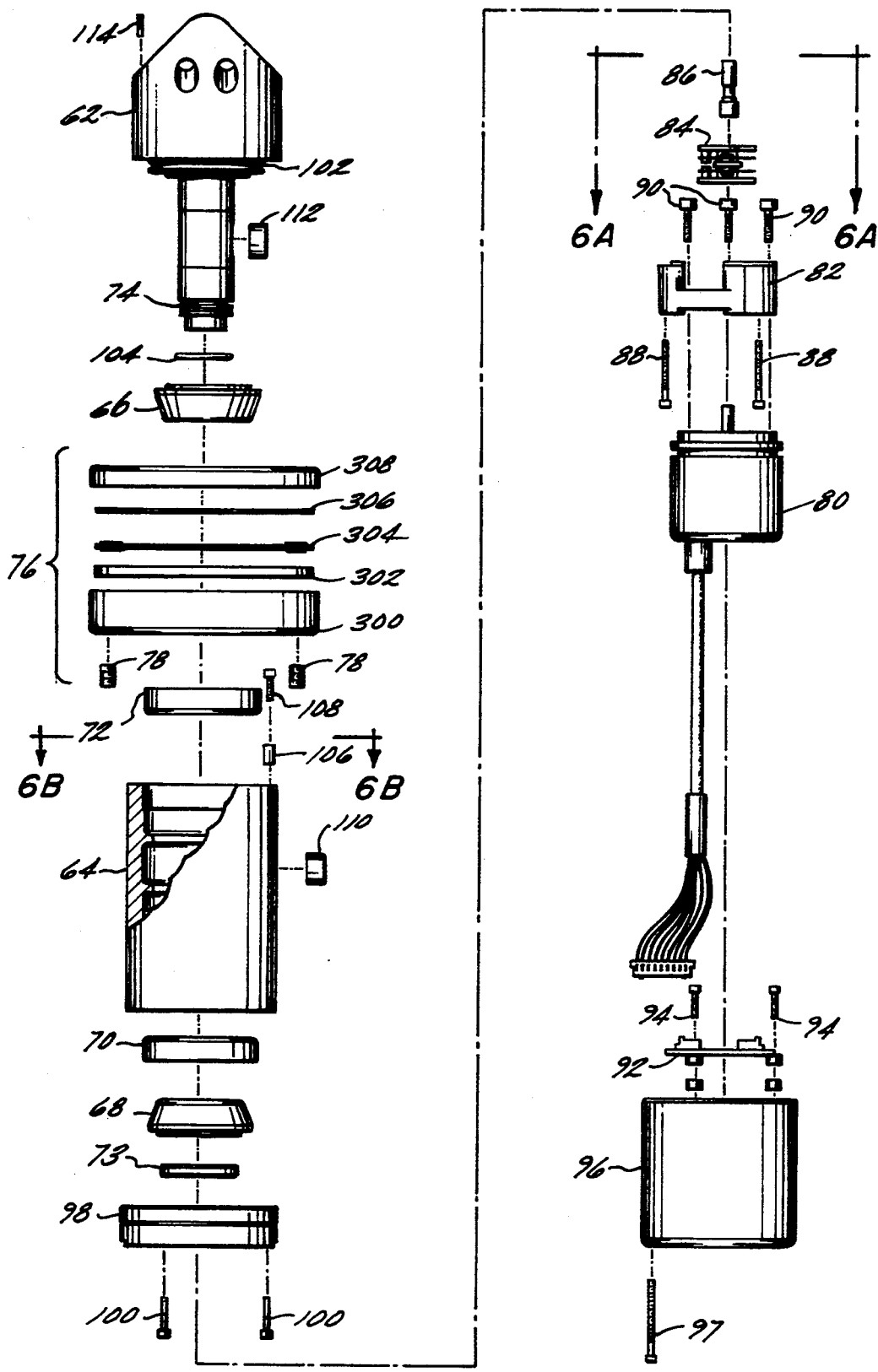
FIG. 6 is an exploded, side elevation view of a transfer housing used in the CMM of FIG. 1.

Turning now to FIGS. 6 and 7, a detailed description will be made of a transfer housing and its internal components. It will be appreciated that FIG. 6 is an exploded view of a transfer housing, while FIG. 7 shows an enlarged view of the transversely oriented and attached transfer housings (e.g., housings 46 and 48). Each housing includes an internal carrier 62 and an external casing 64. Mechanical stability between internal carrier 62 and external casing 64 is provided by two counter-positioned (e.g., oppositely disposed) conical roller bearings 66, 68 positioned to compress against their respective conical races, 70, 72. Conical races 70 and 72 are permanently affixed into the external transfer casing 64. Carrier includes a shaft 122 extending therefrom and terminating at threading 74. Conical bearings 66, 68 are preferably made from hardened steel while races 70, 72 are also made from hardened steel.

Figure 6A:
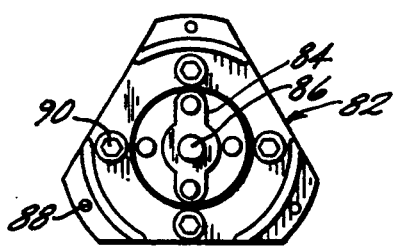
FIGS. 6A and 6B are views along the lines 6A—6A and 6B—6B, respectively, of FIG. 6.

During assembly of transfer casing 48, a compressional force is applied using a nut 73, which is tightened to a specific torque on threads 74, providing a prestressed bearing situation resulting in no motion other than axial rotation under typically applied loads. Because of the necessity of a low profile for such an arm during manual handling and the attendant reduction in the overall stiffness, it is preferable and, in fact required in certain applications, to also install a thrust bearing 76 at the interface between carrier 62 and casing 64. Thrust bearing 76 provides further mechanical stiffening between carrier 62 and casing 64 of the transfer housing. Thrust bearing 76 comprises five elements including thrust adjustment ring 300, flat annular race 302, roller bearing and cage 304, annular race 306 and opposing thrust cover 308. Thrust bearing 76 is adjusted through a series of set screws 78 and provides for high bending stiffness. The transducer, (preferably an encoder 80 such as is available from Heidenhain under the designation Mini-Rod, part no. 450M-03600), is mounted to a universal mounting plate 82 for mounting into the transfer casing. Universal mounting plate 82 is important in satisfying possible component availability problems such that a change in manufacture of transducer 80 and, hence, the change in mounting screw configuration can be accommodated through modifications in the mounting plate 82. Mounting plate 82 is shown in FIG. 6A as a triangular shaped plate having rounded corners. FIG. 6A also depicts threaded members 88 and 90, a pin 86 and a coupler 84 (all of which are discussed hereinafter).

Figure 6B:
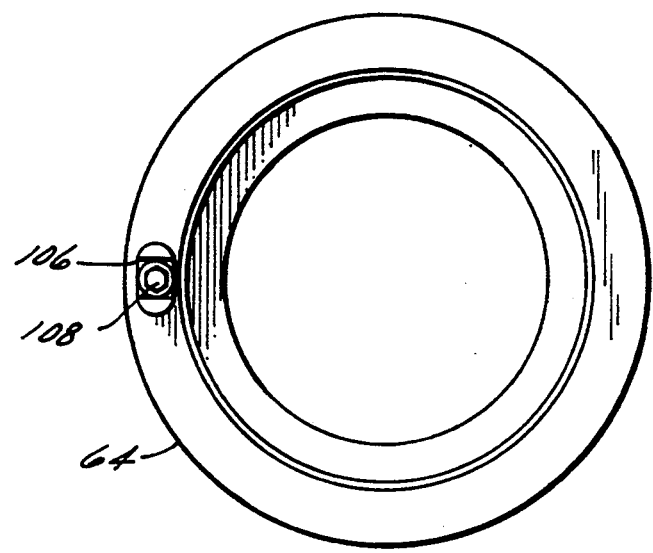

High accuracy rotational measurements using encoders 80 require that there should be no loads applied to the encoders and that motion of the transfer casing be accurately transmitted to the encoder despite small misalignments of the axis of the transfer casing and axis of the encoder. The angular transfer errors are well known to those skilled in the art from the published encoder literature. Communicating with encoder 80 is a coupler 84 such as is available from Rembrandt under the designation B1004R51R. An extension shaft 86 is utilized for ultimately connecting encoder 80 to the transfer casing 64. Shaft 86 is attached both to coupler 84 and to the end of carrier 62 at threading 74 using set screws 88, 90 (see FIG. 7). In accordance with an important feature of this invention, an electronic preamplifier board 92 is positioned in close proximity to encoder 80 and is mounted (via screws 94) on the inside of cap cover 96. Cap cover 96 is attached to casing 64 via screw 97. A transition housing 98 interconnects cap cover 96 to casing 64 via screw 97 and screws 100. Sealing of the transfer housing to the environment is accomplished at the joint using an O-ring groove 102 in which is mounted a standard rubber O-ring groove 104. A rotational endstop 106 (to be discussed hereinafter), is best shown in FIG. 6B and comprises a square shaped metal housing having an opening therethrough which is mounted onto casing 64 using bolt 108 threaded through the opening of the housing. Wire pass through grommets to stop abrasion over long term use are mounted on both carrier 62 and casing 64 at 110 and 112. A location pin 114 is received by a complimentary shaped recess 116 in carrier 62 for the purpose of maintaining relative orientation of two adjacent transfer casings.

Referring to FIG. 7, for environmental and other reasons, it is important that all wires be completely hidden from sight and, therefore, contained within the arm 12. FIG. 7 depicts two assembled transfer housings 46, 48 mounted perpendicularly to each other and demonstrating the passage of wires. It will be appreciated that during use of CMM 10, the encoder information from encoder 80 is passed to its processor board 92 through wire 118 which is then amplified and passed through the arm by machined passageways 120. Wire 118 then passes through a channel 120 in the shaft 122 of the internal carrier 62 of the transfer casing 46 and through a grommetted hole 124 at which time it passes into a large cavity 126 machined on the external casing 64 of transfer housing 46. Cavity 126 permits the coiling of the wire strands during rotation of the transfer casing and is configured so as not to produce any wire abrasion and a minimum of wire bending. However, because the wire limits the overall ability to fully rotate, an incomplete spherical groove 128 is created in which is positioned an endstop screw, 130 which limits the full rotation, in this case to 330°. It will be appreciated that the pass through channel 120 and wire coiling cavities 122 are subsequently repeated in each transfer casing allowing the wires to progressively make their way down to the connector mounted at the base 14, resulting in no exposed wiring.

Figure 16:
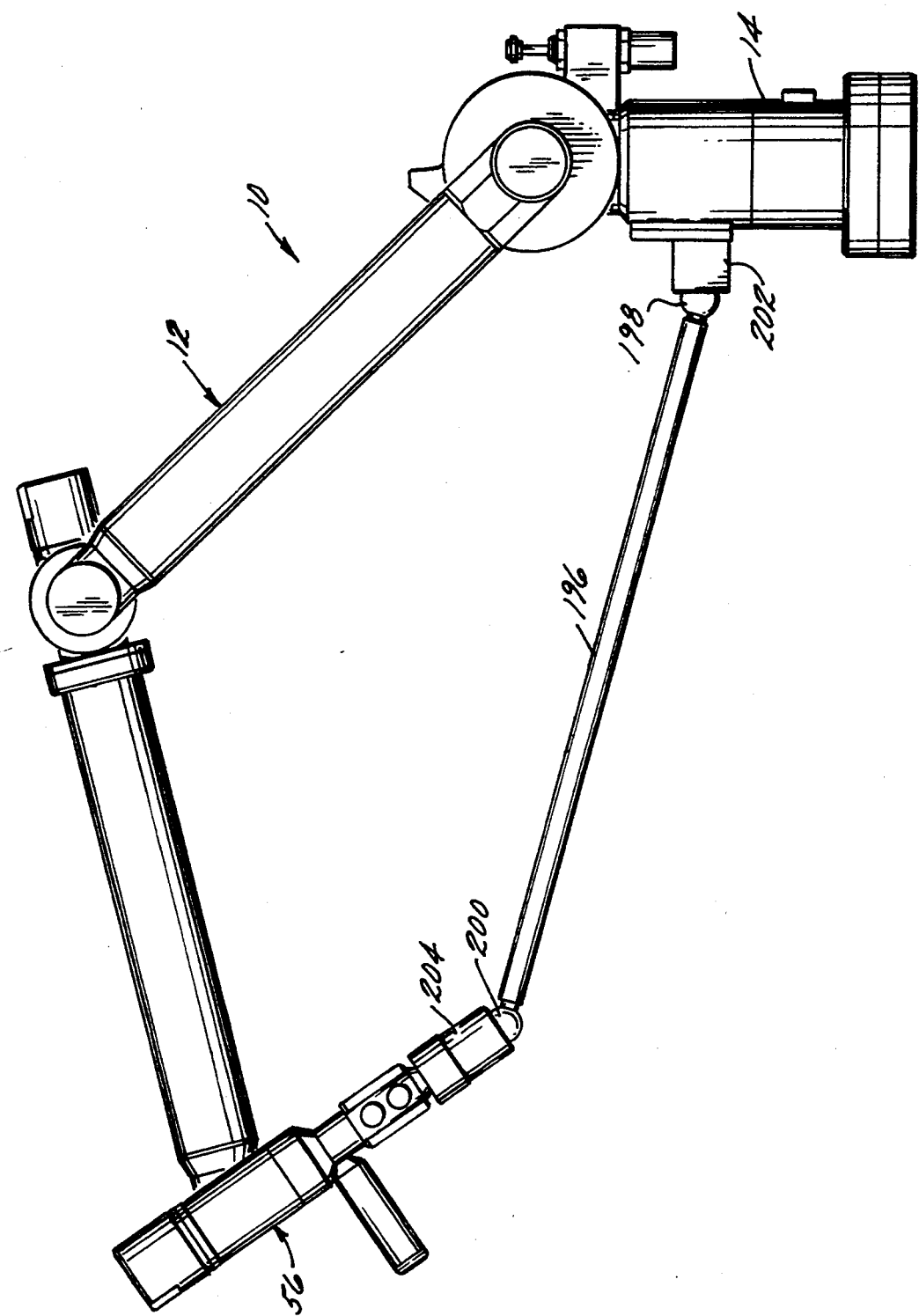
FIG. 16 is a side elevation view of the CMM of FIG. 1 being calibrated with a ballbar.
Figure 17:
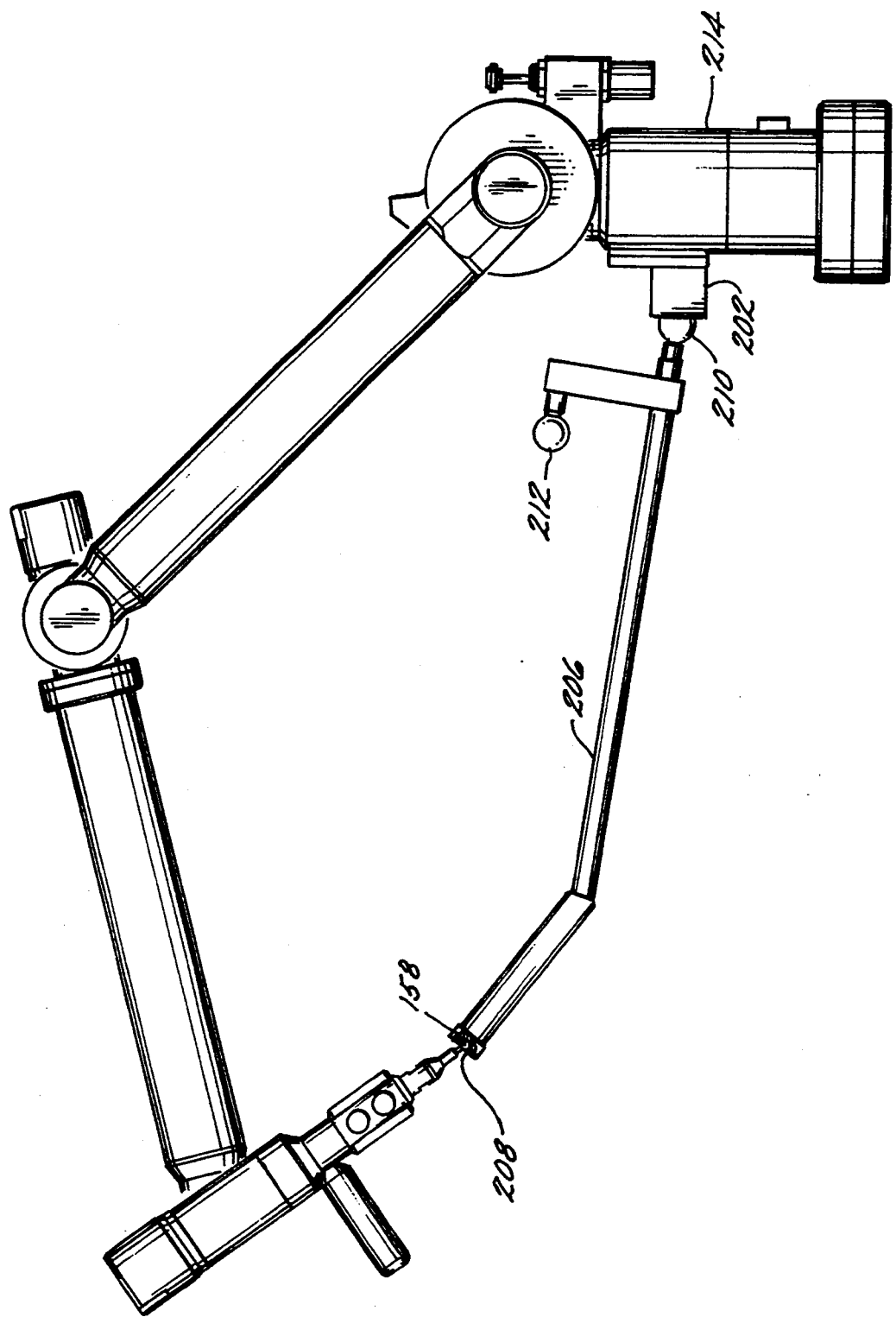
FIGS. 17 and 18 are side elevation views of the CMM of FIG. 1 being calibrated by a novel cone ballbar device.
Figure 18:
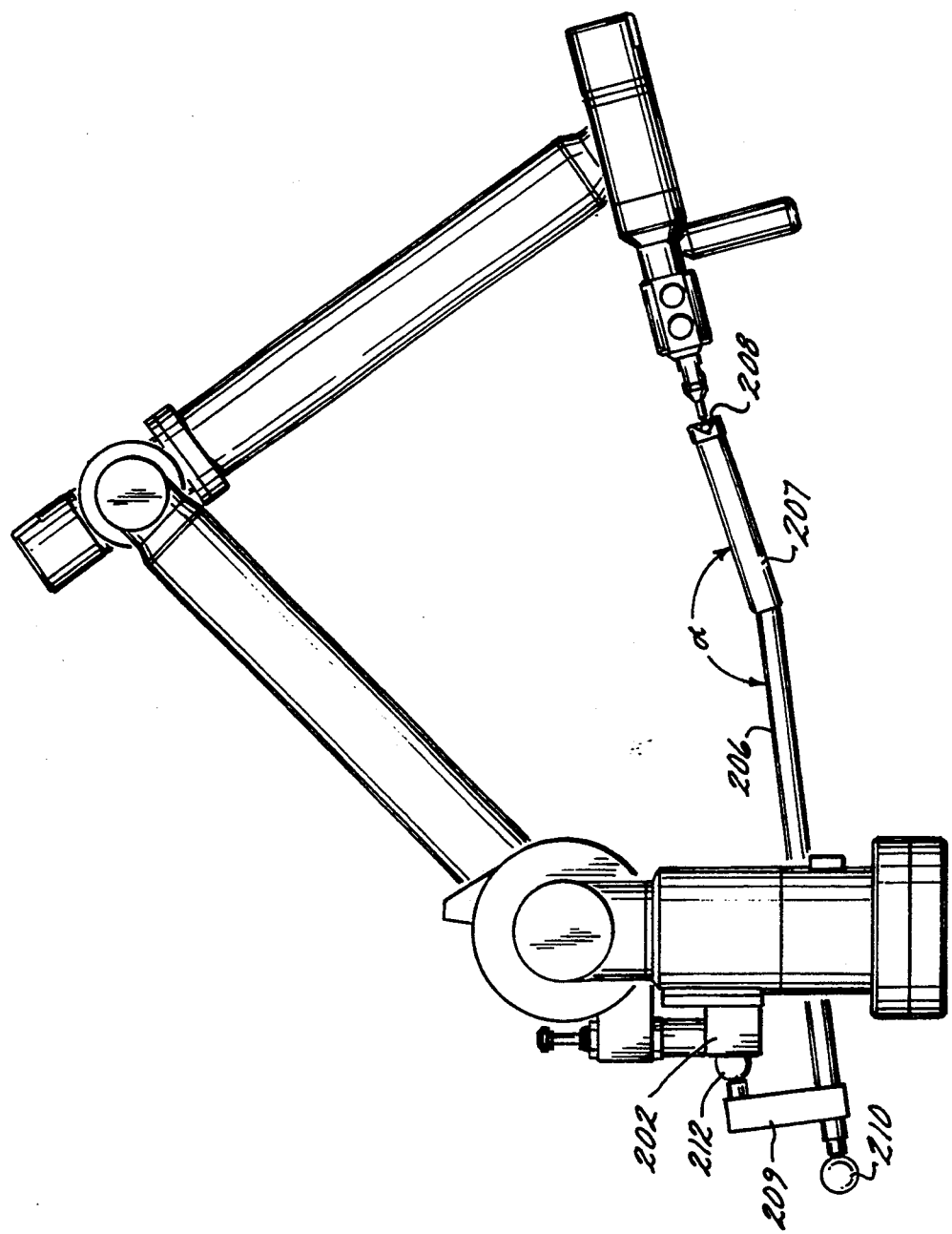

Turning now to FIG. 8, the construction of the aluminum arm as well as the various bearings and transducers results in an accumulated weight of approximately 10 to 15 pounds at the probe handle assembly 56 of CMM 10. Under normal circumstances, this would create a significant amount of fatigue during use and, hence, must be counterbalanced. Weight counterbalances are not preferred since they would significantly increase the overall weight of the device when being considered for transportability. Therefore, in a preferred embodiment counterbalancing is performed using counterbalance device 60 which comprises a torsional spring 132 housed in a plastic casing 134 and mounted at transfer housing 42 at base 14 for providing a lift for arm 12. Coiled torsional spring 132 can be mounted in a variety of positions affecting the overall pretension and, hence, may be usable on a variety of lengths and weights of arms 12. Similarly, due to the weight of arm 12 and the effect of the recoiled spring, significant shock loads may occur when repositioning the arm to the storage position. To prevent significant shocking of the arm upon retraction, air piston shock absorber 134 is also configured into plastic housing 142 of counterbalance spring device 60. This results in an absorption of the shock load and slow relaxation into the rest position. It will be appreciated that FIG. 8 depicts the shock absorber 134 in a depressed configuration while FIGS. 16-18 depict shock absorber 134 in a fully extended position.

Figure 9A:
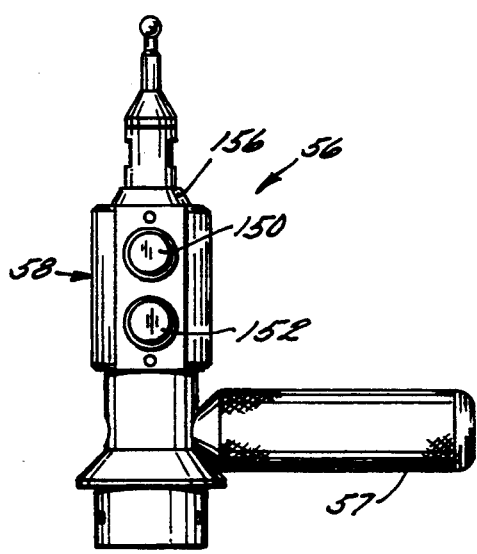
FIGS. 9A and 9B are top and bottom plan views depicting the handle/probe assembly of FIG. 1.
Figure 9B:
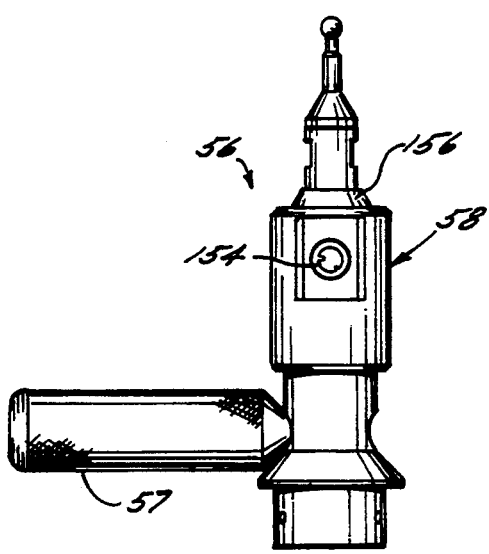

In FIGS. 9A and 9B, top and bottom views of probe handle assembly 56 are shown. Probe handle assembly 56 is meant to be held as either a pencil or pistol grip and possesses two switches (items 150 and 152 in FIG. 9A) for data taking, a connector (item 154 in FIG. 9B) for the attachment of optional electronics and a threaded mount 156 for receiving a variety of probes. Because the CMM 10 is a manual measurement device, the user must be capable of taking a measurement and then confirming to CMM 10 whether the measurement is acceptable or not. This is accomplished through the use of the two switches 150, 152. The front switch 150 is used to trap the 3-dimensional data information and the back switch 152 confirms its acceptance and transmits it to the host computer 18. On the back of the switch enclosure 58 (housing 150, 152) is connector 154 which possesses a number of voltage lines and analog-to-digital converter lines for general attachment to a number of options such as a laser scanning device or touch probe.

Figures 10A, 10B:
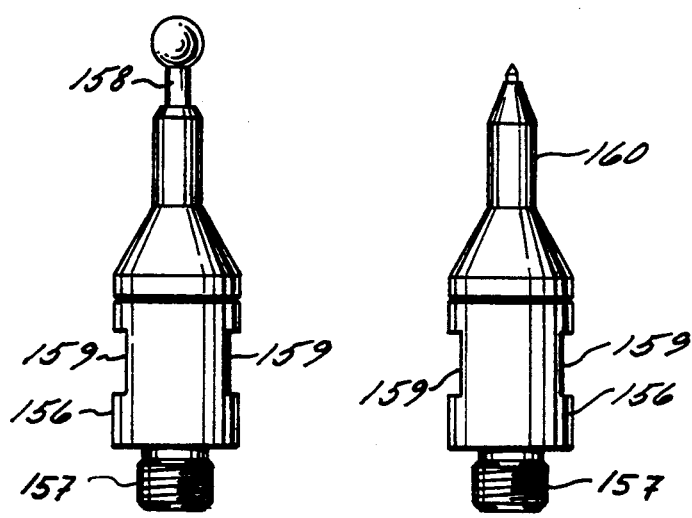
FIGS. 10A and 10B are respective side elevation views of a ball probe and a point probe.

A variety of probes may be threaded to handle assembly 56. In FIG. 10A, a hard ¼ inch diameter ball probe 158 is shown while in FIG. 10B, a point probe 160 is shown. Both probes 158, 160 are threadably mounted to mount 156, which in turn, is threadably mounted to probe housing 58 (using male threaded members 157). Mount 156 also includes a plurality of flat surfaces 159 for facilitating engagement and disengagement of the probes using a wrench.

Figure 11:
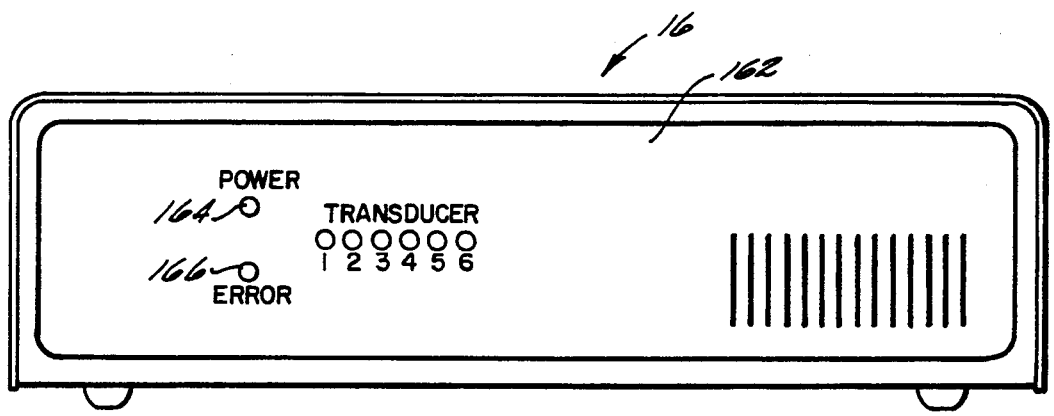
FIG. 11 is an enlarged front view of the controller box of FIG. 1.
Figure 12:
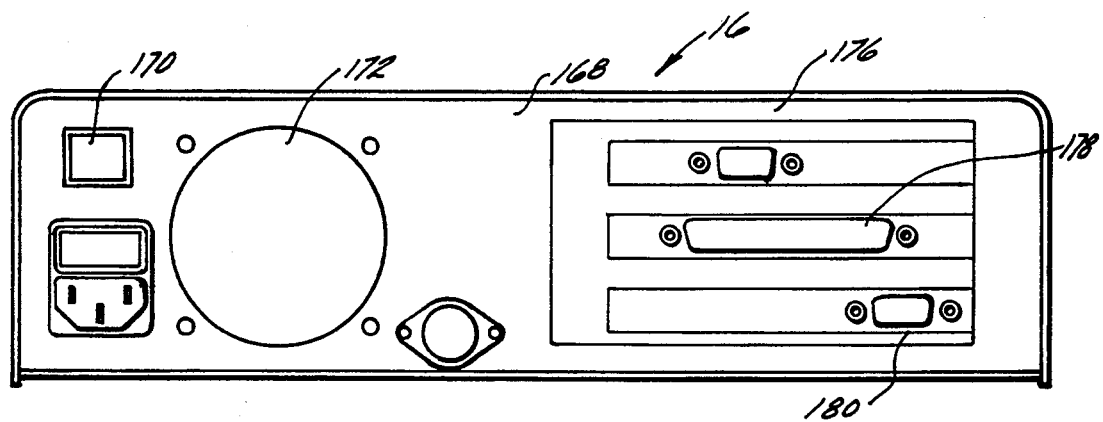
FIG. 12 is an enlarged rear view of the controller box of FIG. 1.

Turning now to FIGS. 11 and 12, a description of the controller or serial box 16 now follows. FIG. 11 shows the front panel face 162 of the controller or serial box 16. Front panel 162 has eight lights including power indicator light 164, error condition light 166, and six lights 20, one for each of the six transducers (identified as items 1-6) located in each transfer housing. Upon powering up, power light 164 will indicate power to the arm 12. At that time, all six transducer lights will indicate the status of each of the six transducers. In a preferred embodiment of this invention, the transducers are incremental digital optical encoders 80 and require referencing. (In a less preferred embodiment, the transducers may be analog devices). Hence, upon start up, each of the six joints (e.g., transfer housings) must be rotated to find the reference position at which time the six lights shall turn off.

In accordance with an important feature of the present invention, during usage, should any of the transducers approach its rotational endstop 106 from within 2 degrees, a light and an audible beep for that particular transducer indicates to the user that the user is too close to the end stop; and that the orientation of the arm should be readjusted for the current measurement. The serial box 16 will continue to measure but will not permit the trapping of the data until such endstop condition is removed. A typical situation where this endstop feature is necessary is the loss of a degree of freedom by the rotation of a particular transducer to its endstop limit and, hence, the applications of forces on the arm causing unmeasured deflections and inaccuracies in the measurement.

At any time during the measurement process, a variety of communication and calculation errors may occur. These are communicated to the user by a flashing of the error light and then a combination of lights of the six transducers indicating by code the particular error condition. It will be appreciated that front panel 162 may alternatively utilize an alphanumeric LCD panel giving alphanumeric error and endstop warnings.

Turning to FIG. 12, the rear panel 168 of serial box 16 includes a variety of standard PC connectors and switches including a reset button 170 which resets the microprocessor; an AC input fan 172 for air circulation; a connector 174 for a standard PC AT keyboard, connector 176 for an optional VGA board for monitoring of the internal operations of serial box 16, connector 178 for receiving the variety of signal lines for the CMM data, and connector 180 for the standard RS232 connector for the host 18.

Serial box 16 is responsible for monitoring the temperature of the CMM and in real time modifying the kinematics or mathematics describing its motion according to formulas describing the expansion and contraction of the various components due to changes in temperature. For this purpose, and in accordance with an important feature of this invention, a temperature monitoring board 182 (which includes a temperature transducer) is positioned at the location of the second joint 42 on the interior of a cover 184 (see FIGS. 4 and 5). CMM 10 is preferably constructed of aircraft grade aluminum externally and anodized. Preferably, the entire arm 12 is constructed of the same material except for the mounting screws which are stainless steel. The same material is used throughout in order to make uniform the expansion and contraction characteristics of arm 12 and make it more amenable to electronic compensation. More importantly, the extreme degree of stability required between all parts through the large temperature range requires that there be no differential thermal expansion between the parts. As mentioned, the temperature transducer 182 is preferably located at transfer housing 42 because it is believed that this location defines the area of highest mass and is therefore the last area to be stabilized after a large temperature fluctuation.

Figure 13:
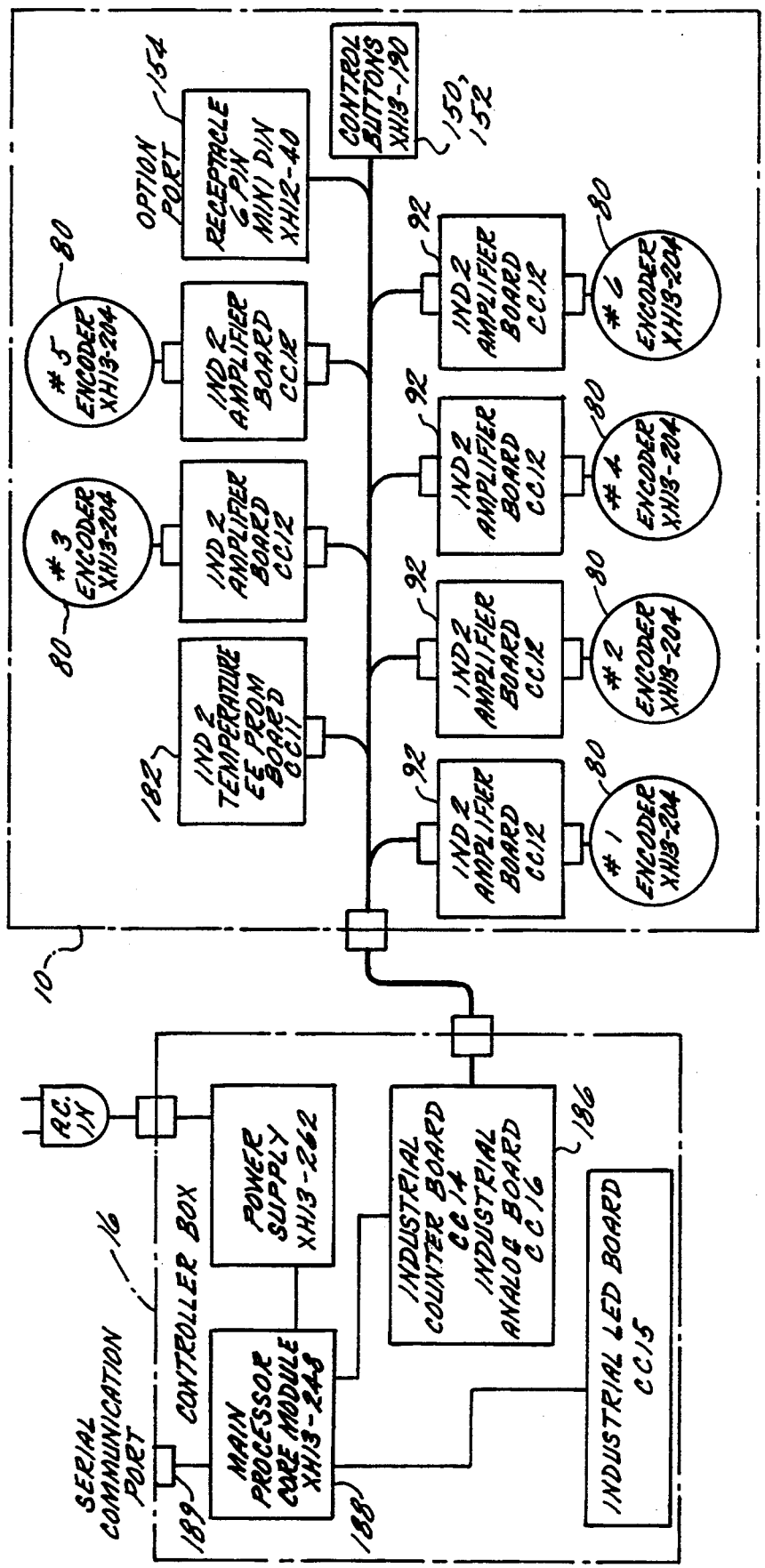
FIG. 13 is a schematic view of the electronic components for the three dimensional measuring system of FIG. 1.

Referring now to FIG. 13, the overall electronic schematic layout for CMM 10 and serial box 16 is shown. Six encoders 80 are shown with each encoder having an amplifier board 92 located in close proximity to it for the minimization of noise on signal transfer. An option port 154 is shown which is a six pin connector available at the handle 56 for the attachment of a variety of options. Two control buttons 150 and 152 for indicating to serial box 16 the measurement process, are also shown.

The temperature transducer is associated with a temperature circuit board 182 which is also located in arm 12 as shown in FIG. 13. In accordance with still another important feature of this invention, the temperature board 182 comprises an EEPROM board. The EEPROM is a small computerized memory device (electrically erasable programmable read only memory) and is used to contain a variety of specific calibration and serial number data on the arm (see discussion regarding FIGS. 19-21). This is a very important feature of this invention which permits high quality control of CMM 10 and importantly, precludes the inadvertent mixup of software and arms. This also means that the CMM arm 12 is a stand alone device not requiring specific calibration data to reside in controller box 16 which may need to be separately serviced and/or switched with other machines.

The electronic and pulse data from the arm electronics is then transmitted to a combined analog-to-digital converter/digital counting board 186 which is a paired set comprising a 12 bit analog to digital converter and a multi channel 16 bit digital counter. Board 186 is positioned on the standard buss of the controller box. The counting information is processed using the core module 188 (comprising a commercially available Intel 286 microprocessor such as a part number CMX-286-Q51 available from Ampro) and programs stored on an EEPROM also residing in the controller box. Subsequent data is then transmitted through the serial communication port 189.

The microprocessor-based serial box 16 permits preprocessing of calculations specific to CMM 10 without host level processing requirements. Typical examples of such preprocessor calculations include coordinate system transformations; conversion of units; leap-frogging from one coordinate system to another by using an intermediary jig; performance of certain certification procedures, including calculations of distance between 2 balls (such as in ANSI B89 ballbar); and outputting data in specific formats required for downloading to a variety of hosts and user programs.

The serial box is configured to communicate with a variety of host formats including PC, MSDOS, Windows, Unix, Apple, VME and others. Thus, the serial box processes the raw transducer data on an ongoing basis and responds to the information requests or polling of the host computer with the desired three dimensional positional or orientational information. The language of the serial box is in such a form that drivers or computer communication subroutines in microprocessor 188 are written in the language of the host computer so as to drive the serial port and communicate with CMM 10. This function is designated the "intelligent multi-protocol emulation and autoswitching" function and works as follows: A variety of host programs may be installed on the host computer. These host programs will poll the serial port with a variety of requests to which the serial box must respond. A number of protocols have been preprogrammed into the serial box to respond to polls or inquiries on the serial port for a variety of different, popular softwares. A polling request by a software requires a specific response. The serial box will receive the polling request, establish which protocol it belongs to, and respond in the appropriate manner. This allows transparent communication between CMM 10 and a wide variety of application software such as computer aided design and quality control softwares, e.g., AutoCad ® from Autodesk, Inc., CADKEY ® from Cadkey, Inc., and other CAD programs; as well as quality control programs such as GEOMET ® from Geomet Systems, Inc. and Micromeasure III from Brown and Sharpe, Inc.

The three dimensional CMM of the present invention operates as follows. Upon power up, the microprosser 188 in the serial box 16 undergoes start up self-checking procedures and supplies power through the instrument port to arm 12 of CMM 10. The microprocessor and software residing on EEPROM 182 determines that upon initial power up none of the encoders 80 have been initialized. Hence, the microprocessor 188 sends a signal to the display board lighting all the lights 20, indicating a need to be referenced. The user will then mechanically move the arm which will cause the transducers to individually scan their range, at which time a reference mark is passed. When the reference mark is passed, the digital counter board 186 responds by trapping its location and identifying to the front display board 20 that the transducer has been referenced and the light is extinguished. Once all transducers have been referenced, the system establishes serial communication with the host and waits for further instruction. Pressing of the front or back button of handle 56 will initiate a measurement process. Pressing the front button 150 will trap the current transducer readings. Pressing the back button 152 will indicate to the microprocessor that these values are to be translated into dimensional coordinates and issued through the serial port to the host 18. The host 18 and the serial box 16 will then continue to react to each other's serial line requests.

Figure 19:
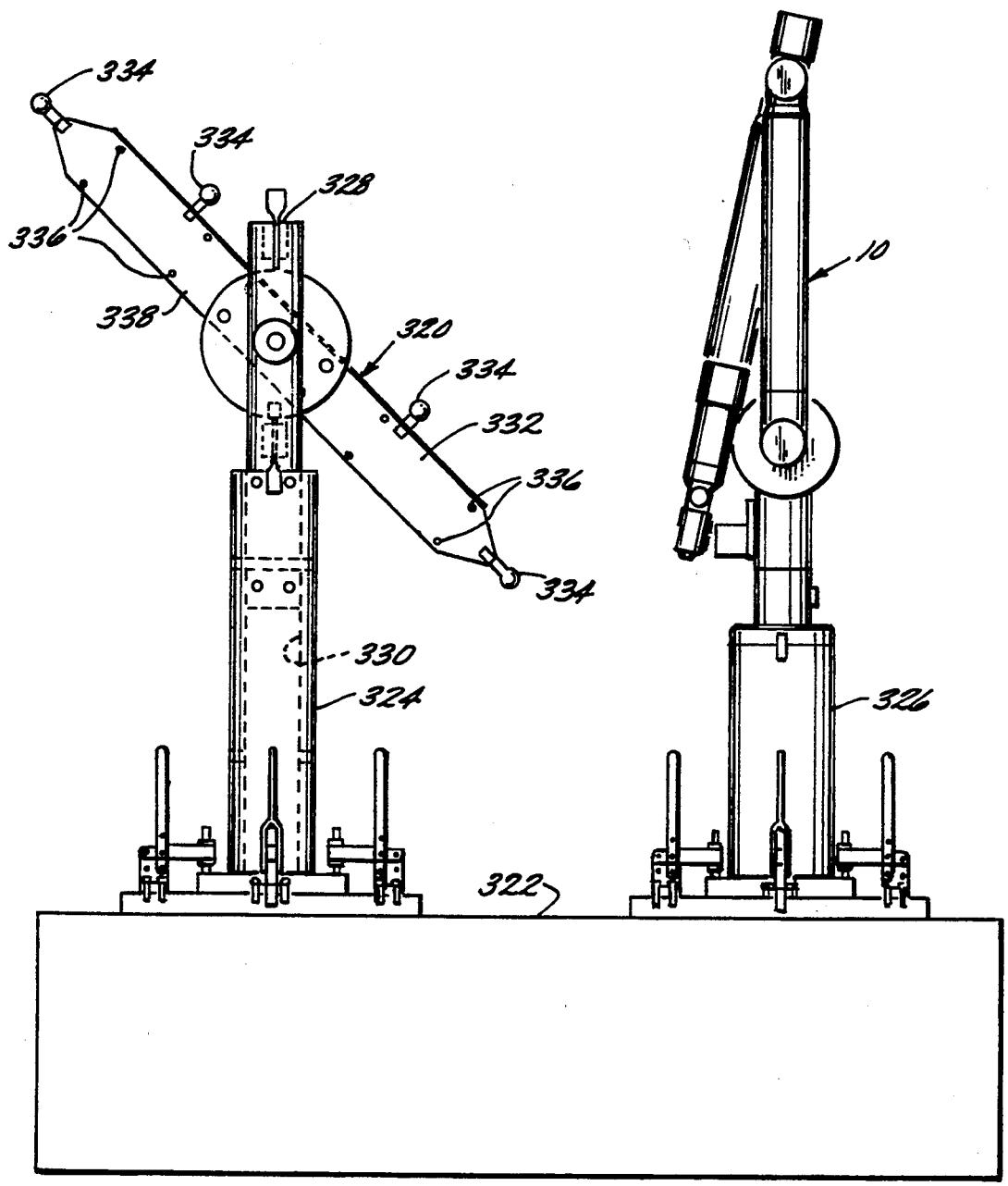
FIG. 19 is a side elevation view depicting a method for optimizing the CMM of FIG. 1 using an optimization jig.
Figure 21:
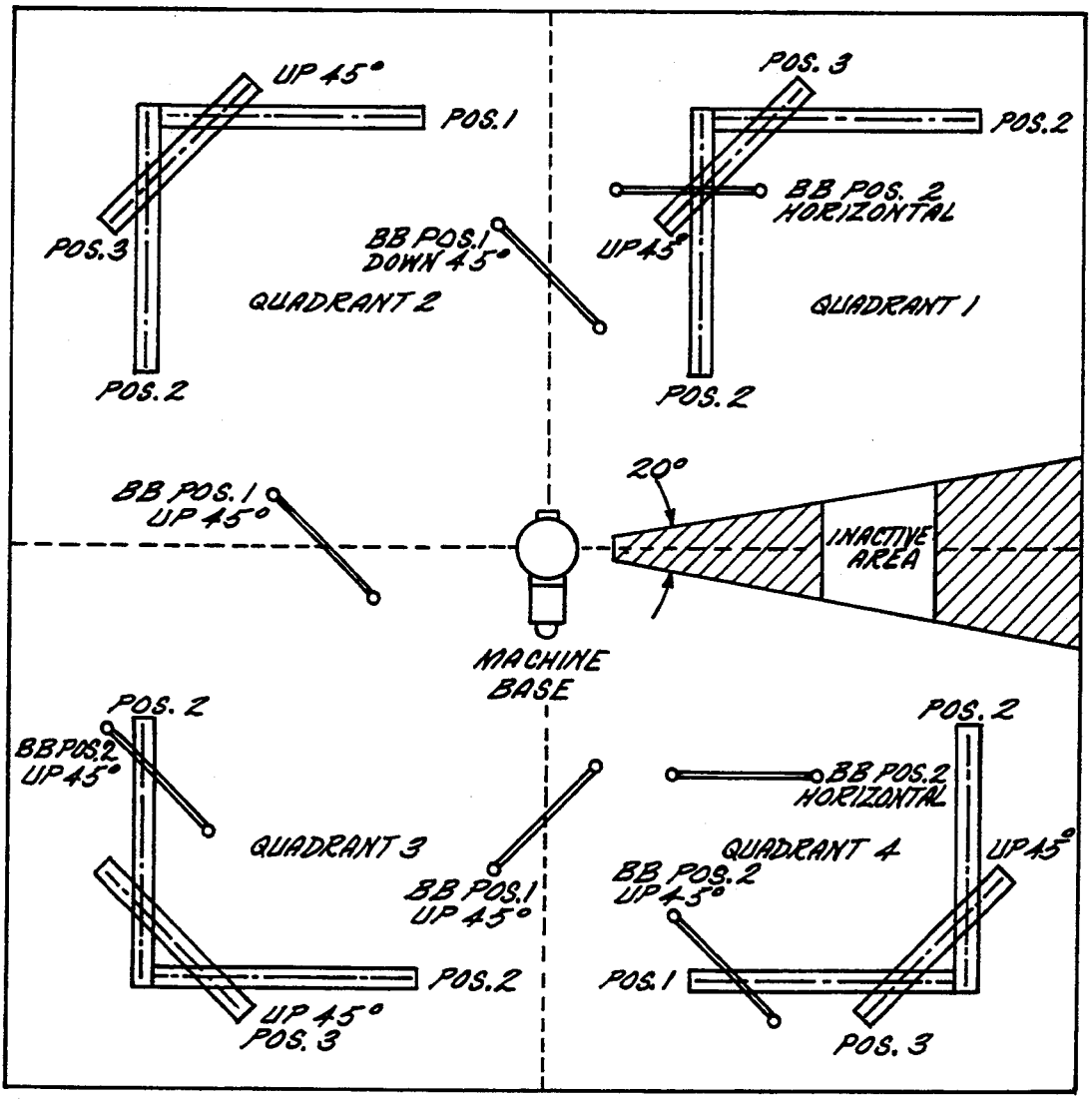
FIG. 21 is a schematic view showing a method of optimizing the CMM of FIG. 1 utilizing the apparatus of FIG. 19.

Turning now to FIGS. 19, 20 and 21 subsequent to assembly of CMM 10, the device is optimized or calibrated by altering the program software to account for any measured imperfections in assembly or machining. This initial calibration is an important feature of this invention and is accomplished in two stages. First, a variety of dimensional measurements are made which include positions, orientations and dimensions throughout the entire volume of the device. Subsequently, an optimization software program is used to determine the actual misalignments existing at each of the joint axes and, hence, adjusting the kinematic formulas describing the motion of the arm. The general result is that imperfect machining and assembly is rendered perfect through the identification of those imperfections and their inclusion in the kinematics of the device.

Referring to FIGS. 19 and 20A–E, due to the huge amount of data and the requirement that it be accurately and easily obtained, a calibration and testing jig is shown at 320. Jig 320 is comprised of a large granite plate 322 to which is attached two spaced towers 324, 326 which can rotate 360 degrees in the horizontal plane. The CMM 10 is mounted on tower 326 and the adjustable dimensional testing jig 320 is mounted on the other tower 324. Jig 320 is mounted on an extendable vertical arm 328 which is vertically displaceable within an opening 330 through tower 324. Arm 328 is shown in a fully extended position.

Still referring to FIGS. 19 and 20, the adjustable dimensional testing jig 320 is comprised of three basic components: a 24 inch bar 332 on which is found a set of precision balls 334, a series of holes 336 positioned along its length, and a 24 inch precision step gauge 338 (shown in detail in FIGS. 20A–E). Arm 332 is used to measure the positions of the holes, steps and balls in a variety of positions for the testing jig and in all areas of the volume of the arm as shown in FIG. 21. This data is then optimized. In summary, the important optimization procedure can be described as follows. Standard test jig 320 with predetermined positions and orientations of objects is measured by arm 10. The data is then processed through a multi-variable optimization program created to provide the relative misalignment and dimension of all major components of the arm. Optimization is performed, at which time a calibration file is produced containing the overall characteristics of the arm. These overall characteristics and subsequent transducer readings are combined in a variety of kinematic formulas which will generate the X, Y and Z values in an absolute coordinate system.

Figure 14:
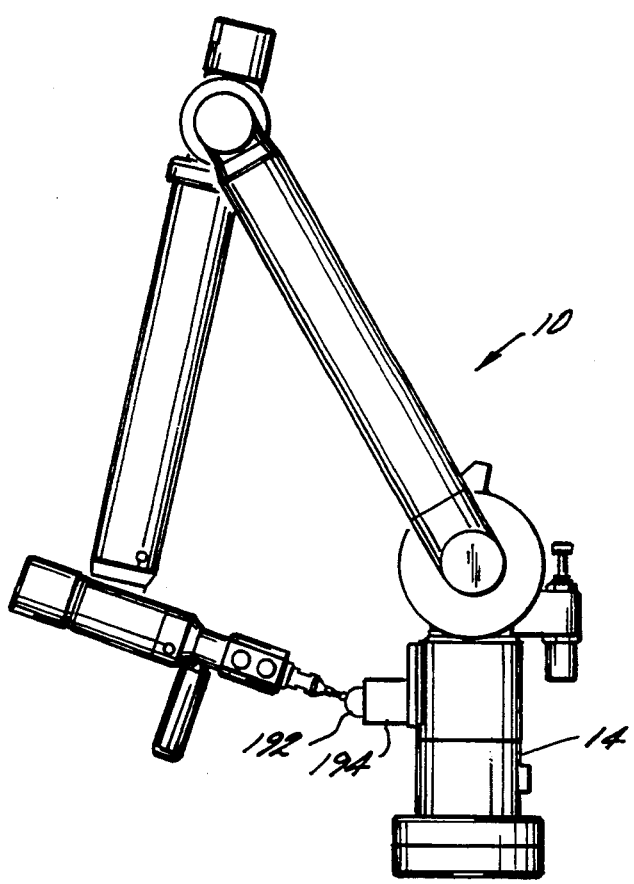
FIG. 14 is a side elevation view of the CMM of FIG. 1 depicting a probe tip calibration system.
Figure 15:
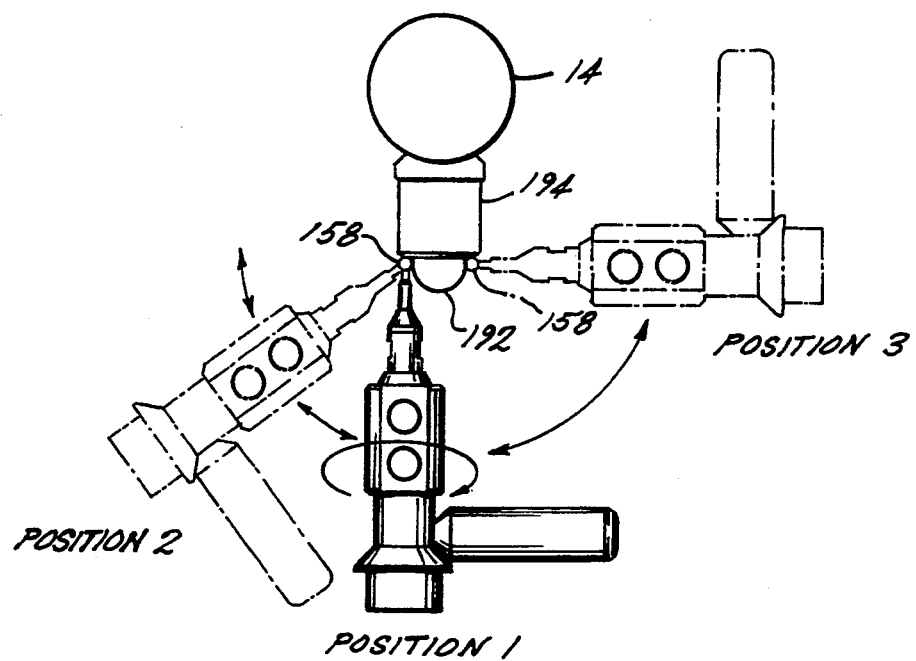
FIG. 15 is a schematic top plan view showing a method of calibrating the probe tip.

In order to further optimize performance, a novel reference ball 192 extends laterally from a detachable mount 194 attached to base 14 of CMM 10 (see FIGS. 14 and 15). By locating reference ball 192 at base 14, ball 92 represents the absolute origin of the device (0, 0, 0) corresponding to the X, Y and Z axes. Because of the known position of reference ball 192, positioning of the tips, as shown in FIG. 15, allows the present invention to determine the coordinates of the digitizer tip 158 in relationship to the last link of CMM 10. Knowledge of this position allows CMM 10 to determine the position of the center of that ball when making subsequent measurements. In a general sense, this means that a variety of different probes may then be attached depending on the particular application and each can be calibrated against the reference ball.

Because of the portable nature of the present invention, it will be subjected to significant mishandling and repositioning in a variety of environments. Therefore, the present invention includes a protocol by which the user may establish a degree of volumetric accuracy prior to using a device according to a convenient maintenance schedule. Volumetric accuracy is defined, according to ASME ANSI B891.1.12 (1989) standard, as the ability of a device to measure a fixed length which is positioned in its working volume in a variety of orientations. FIG. 16 shows the capability of this invention to do this using a first ballbar approach while FIGS. 17 and 18 depict a second ballbar approach.

FIG. 16 shows a standard ballbar 196 at each end of which is positioned a precision spherical ball 198, 200 which are mounted respectively into two magnetic sockets 202 and 204. Socket 202 is located at base 14 of CMM 10 and socket 204 is located at probe handle 56. As arm 12 is moved about, the sockets 202, 204 and balls 198, 200 rotate to accommodate this movement and CMM 10 is required to measure the fixed distance between the center of ball 200 and socket 204 at the handle 56 and the center of ball 198 at the base. Remembering, of course, that socket 202 at base 14 represents the 0, 0, 0 coordinate of CMM 10, calibration software in control box 16 then calculates the vector length from the 0, 0, 0 to the center of the ball at the probe and this length, which, of course, is unchanging during the test, must measure constantly throughout the entire volume through multiple configurations and rotations of the handle and other joints.

It will be appreciated that the socket 204 at the handle, may tend to be inconvenient and inconclusive when wanting to verify the accuracy of a particular probe on the handle. Hence, in accordance with an important feature of this invention, a novel cone socket ballbar as shown at 206 in FIG. 17 is used. Cone socket ballbar 206 includes a cone 208 at one end and two balls 210, 212 at the other end. The cone and balls are interconnected by a bar 207 having an angled portion 209 with the angle α preferably comprising 20 degrees. Ball 212 is attached to a mount 211 which extends laterally from bar 207. A ball probe 158 or point probe 160 is positioned in cone socket 208 and ball 210 can be mounted in the standard magnetic socket 202 of base 14 of CMM 10. As in the calibration method of FIG. 16, a number of positions of the ball and bar and joint positions are measured and the distance between cone socket 208 and ball 210 must remain constant. It is the nature of the positioning of ball socket 202 that the user will not be able to reach on the far side of the machine (position shown by Item 214). To this end, ball 212 is used as shown in FIG. 18. This allows the user to position cone ballbar 206 so as to reach on the reverse far side of CMM 10 in order to measure the distance between the center of ball 212 and the center of cone socket 208.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of calibrating a three dimensional coordinate measuring system comprising (1) a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal, said movable arm having six degrees of freedom; (2) a support base attached to said first end of said movable arm; (3) a probe attached to said second end of said movable arm; and (4) electronic circuit means for receiving said position signals from said transducer means and providing a digital coordinate corresponding to the position and orientation of said probe in a selected volume, the calibration method including the steps of:

measuring predetermined positions and orientations with said movable arm to obtain known positioning data;

processing said known positioning data through an optimization program to determine the relative misalignments and dimensions of components in said arm;

optimizing said arm by incorporating said relative misalignments and dimensions in kinematic formulas for generating X, Y and Z values in an absolute coordinate system with respect to both position and orientation and wherein said optimizing step further includes compiling a calibration file for said arm containing said relative misalignments and dimensions.

2. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;

a support base attached to said first end of said movable arm;

a probe attached to said second end of said movable arm;

electronic circuit means for receiving said position signals from said transducer means and providing a digital coordinate corresponding to the position of said probe in a selected volume; and wherein said transfer housing further includes;

a carrier having a shaft extending therefrom;

a casing having an opening therethrough for receiving said shaft of said carrier; and roller bearing means on said shaft within said opening, said roller bearing means comprising two oppositely disposed, spaced conical roller bearings with each conical roller bearing abutting a complimentary shaped conical race.

3. The measuring system of claim 2 wherein said conical races are permanently affixed to said casing.

4. The measuring system of claim 2 including:
compression means for prestressing said conical roller bearings.

5. The measuring system of claim 4 wherein said compression means comprises:
a compression nut threadably attached to said shaft of said casing and sandwiching therebetween said conical roller bearings.

6. The measuring system of claim 2 including:
thrust bearing means positioned at an interface between said carrier and said casing for providing mechanical stiffening between said carrier and casing.

7. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;
a support base attached to said first end of said movable arm;
a probe attached to said second end of said movable arm;
electronic circuit means for receiving said position signals from said transducer means and providing a digital coordinate corresponding to the position of said probe in a selected volume; and
wherein said transfer housing further includes;
a carrier having a shaft extending therefrom;
a casing having an opening therethrough for receiving said shaft of said carrier;
roller bearing means on said shaft within said opening; and
thrust bearing means positioned at an interface between said carrier and said casing for providing mechanical stiffening between said carrier and casing.

8. The measuring system of claim 7 including:
means for adjusting said thrust bearing means.

9. The measuring system of claim 7 wherein said thrust bearing means comprises:
(1) thrust adjustment ring means;
(2) first annular race means adjacent said thrust adjustment ring means;
(3) second annular race means;
(4) roller bearing means sandwiched between said first and second annular race means;
(5) thrust cover means adjacent said second annular race means; and
(6) retaining means for fastening as a unit items (1), (2), (3), (4) and (5).

10. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;
a support base attached to said first end of said movable arm;
a probe attached to said second end of said movable arm;
electronic circuit means for receiving said position signals from said transducer means and providing a digital coordinate corresponding to the position of said probe in a selected volume; and
wherein said position transducer comprises an encoder and wherein said transfer housing includes;
preamplifier circuit board means in a location adjacent said encoder for transmitting amplified signals externally of said movable arm.

11. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;
a support base attached to said first end of said movable arm;
a probe attached to said second end of said movable arm;
electronic circuit means for receiving said position signals from said transducer means and providing a digital coordinate corresponding to the position of said probe in a selected volume; and
wherein said transfer housing further includes;
endstop indicator means for preventing mechanical overload due to mechanical stressing of said transfer housing.

12. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;
a support base attached to said first end of said movable arm;
a probe attached to said second end of said movable arm;
electronic circuit means for receiving said position signals from said transducer means and providing a digital coordinate corresponding to the position of said probe in a selected volume; and
temperature monitoring means in said arm for monitoring temperature stability of said arm.

13. The measuring system of claim 12 wherein said temperature monitoring means varies the length of selected components of said arm with respect to temperature to provide accurate absolute measurements.

14. The measuring system of claim 12 wherein said arm includes a location corresponding to the highest mass of said arms and wherein:
said temperature monitoring means is positioned at said high mass location.

15. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;

a support base attached to said first end of said movable arm;

a probe attached to said second end of said movable arm;

electronic circuit means for receiving said position signals from said transducer means and providing a digital coordinate corresponding to the position of said probe in a selected volume; and EEPROM circuit board means mounted in said arm and encoded with calibration and identification data specified to a particular arm.

16. The measuring system of claim 15 including:

a discrete serial box communicating with said arm and including at least a portion of said electronic circuit means, said serial box including microprocessor means for preprocessing position data prior to transfer of said position data to a host computer.

17. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;

a support base attached to said first end of said movable arm;

a probe attached to said second end of said movable arm;

electronic circuit means for receiving said position signals from said transducer means and providing a digital coordinate corresponding to the position of said probe in a selected volume;

a discrete serial box communicating with said arm and including at least a portion of said electronic circuit means, said serial box including microprocessor means for preprocessing position data prior to transfer of said position data to a host computer; and wherein said position transfer means comprises an encoder and wherein said housing includes preamplifier circuit board means in a location adjacent said encoder for transmitting amplified signals from said movable arm to said serial box.

18. The measuring system of claim 17 wherein said serial box further includes:

analog-to-digital/digital counter circuit board means for simultaneous capture of data from all of said position transducers and transfer of said captured data to said microprocessor means.

19. The measuring system of claim 17 including:

serial port communications means associated with said serial box.

20. The measuring system of claim 17 wherein said serial box further includes:

means for communicating with a plurality of computer formats associated with the host computer.

21. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;

a support base attached to said first end of said movable arm;

a probe attached to said second end of said movable arm;

electronic circuit means for receiving said position signals from said transducer means and providing a digital coordinate corresponding to the position of said probe in a selected volume;

a discrete serial box communicating with said arm and including at least a portion of said electronic circuit means, said serial box including microprocessor means for preprocessing position data prior to transfer of said position data to a host computer;

temperature monitoring means in said arm for monitoring temperature stability in said arm; and means for transferring said monitored temperature to said microprocessor means in said serial box.

22. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;

a support base attached to said first end of said movable arm;

a probe attached to said second end of said movable arm;

electronic circuit means for receiving said position signals from said transducer means and providing a digital coordinate corresponding to the position of said probe in a selected volume; and a portable base for supporting said arm, said portable base being movable along a mounting surface and including reference ball means for evaluating and calibrating measurement accuracy independently of any mounting surface on which said portable base moves.

23. The measuring system of claim 22 wherein:

said reference ball means is positioned on a mount detachably attached to said base.

24. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;

a support base attached to said first end of said movable arm;

a probe attached to said second end of said movable arm;

electronic circuit means for receiving said position signals from said transducer means and providing a digital coordinate corresponding to the position of said probe in a selected volume; and wherein said probe includes a pair of first and second switches, said first switch corresponding to data "take" and said second switch corresponding to data "acceptance".

25. The measuring system of claim 24 wherein said transfer housing includes:
universal mounting plate means for mounting said position transducer to said carrier.

26. The measuring system of claim 24 wherein said transfer housing includes:
coupler means attached to said position transducer; and
an extension shaft connecting said transducer to said shaft of said carrier.

27. The measuring system of claim 24 including:
a base for supporting said arm;
calibration means for calibrating said system, said calibration means interacting with a semi-spherical mount on said base and including;
a bar having opposed first and second ends;
a conical recess on said first end of said bar; and
a first spherical ball on said second end of said bar.

28. The measuring system of claim 27 further including:
a second ball extending laterally from a mount attached to said bar adjacent to said second end.

29. The measuring system of claim 27 including:
a bent section in said bar.

30. The measuring system of claim 27 wherein:
said first spherical mount comprises a magnetic mount.

31. The measuring system of claim 24 wherein:
each of said rotational transfer housings have a modular, interchangeable configuration.

32. The measuring system of claim 24 wherein:
said arm is comprised of substantially the same material to maintain a substantially consistent coefficient of thermal expansion.

33. The measuring system of claim 32 wherein:
said material comprises aluminum.

34. The measuring system of claim 24 wherein said arm includes wiring between the first end and the second end and wherein:
all of said wiring is internal to said arm.

35. The measuring system of claim 24 including:
a base for supporting said arm;
a first spherical mount on said base;
a second spherical mount on said probe;
calibration means for calibrating said system, said calibration means including;
a bar having opposed first and second ends;
a first spherical ball on said first end of said bar; and
a second spherical ball on said second end of said bar.

36. The measuring system of claim 35 wherein:
said first and second spherical mounts comprise magnetic mounts.

37. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;
a support base attached to said first end of said movable arm;
a probe attached to said second end of said movable arm;
electronic circuit means for receiving said position signals from said transducer means and providing a digital coordinate corresponding to the position of said probe in a selected volume; and
wherein said probe includes option port means for attachment to external transducers.

38. A three dimensional coordinate measuring system comprising:
a movable arm having opposed first and second ends, said arm including a plurality of joints with each joint corresponding to a degree of freedom such that said arm is movable within a selected volume, each of said joints comprising a rotational transfer housing for housing position transducer means, said transducer means producing a position signal;
a support base attached to said first end of said movable arm;
a probe attached to said second end of said movable arm;
electronic circuit means for receiving said position signals from said transducer means and providing a digital coordinate corresponding to the position of said probe in a selected volume; and
spring counter balance means for facilitating movement of said arm.

39. The measuring system of claim 38 further including:
shock absorber support means for limiting shocks received by said arm during movement of said arm.

40. The measuring system of claims 2, 7, 10, 11, 12, 15, 17, 21, 22, 24, 37 or 38 wherein
said movable arm has six degrees of freedom and wherein:
said electronic circuit means provides a digital coordinate corresponding to the position and orientation of said probe in a selected volume.

41. The method as claimed in claim 1 wherein said calibration file is stored in said arm.

* * * * *